(12) United States Patent
Kim et al.

(10) Patent No.: US 7,561,375 B2
(45) Date of Patent: Jul. 14, 2009

(54) ASSEMBLY AND METHOD WITH DRIVE DAMPER

(75) Inventors: Ki Taek Kim, Yongin-si (KR); Dong Ok Kwak, Suwon-si (KR); Seong Woon Booh, Yongin-si (KR); Eun Deok Bae, Suwon-si (KR); Jin Woo Cho, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 446 days.

(21) Appl. No.: 11/454,912

(22) Filed: Jun. 19, 2006

(65) Prior Publication Data

US 2007/0014045 A1 Jan. 18, 2007

(30) Foreign Application Priority Data

Jul. 18, 2005 (KR) .................... 10-2005-0064915

(51) Int. Cl.
*G11B 17/00* (2006.01)

(52) U.S. Cl. .................................. 360/97.02

(58) Field of Classification Search ............. 360/97.01, 360/97.02, 97.03, 97.04
See application file for complete search history.

(56) References Cited

U.S. PATENT DOCUMENTS

| 4,553,231 | A | * | 11/1985 | d'Alayer de Costemore d'Arc | 720/651 |
|---|---|---|---|---|---|
| 4,812,932 | A | * | 3/1989 | Hishinuma et al. | 360/97.01 |
| 7,012,805 | B2 | * | 3/2006 | Shah et al. | 361/685 |
| 7,057,849 | B2 | * | 6/2006 | Soderfelt et al. | 360/97.01 |
| 7,123,474 | B2 | * | 10/2006 | Cho | 361/685 |
| 7,251,131 | B2 | * | 7/2007 | Shah et al. | 361/685 |
| 2004/0100724 | A1 | * | 5/2004 | Cho | 360/97.01 |
| 2005/0141132 | A1 | * | 6/2005 | Soderfelt et al. | 360/97.01 |
| 2005/0219738 | A1 | * | 10/2005 | Iida et al. | 360/97.01 |

FOREIGN PATENT DOCUMENTS

| JP | 09-293370 | 11/1997 |
|---|---|---|
| JP | 11-086520 | 3/1999 |
| JP | 2003-272367 | 9/2003 |
| JP | 2004-152403 | 5/2004 |
| KR | 10-1996-24957 | 7/1996 |
| KR | 10-1999-008844 | 5/1999 |
| KR | 10-1999-008845 | 5/1999 |
| KR | 10-2000-0035267 | 6/2000 |

* cited by examiner

*Primary Examiner*—Allen T Cao
(74) *Attorney, Agent, or Firm*—Staas & Halsey LLP (57) ABSTRACT

A disk drive assembly including a disk drive, a bracket for containing the disk drive, and a damper for absorbing an impact transmitted to the disk drive. The damper may have a shape of a ring to encircle a corner of the disk drive and may be formed of an elastic material to buffer an impact transmitted between the disk drive and the bracket. Particularly, since the width and/or diameter of the damper may be formed with a minimized size, the damper is capable of providing sufficient buffering properties. In addition, the space occupied by the damper may further be minimized. Thus, since the space occupied by the disk drive assembly may be reduced, it is possible to favorably apply the assembly to a portable electronic device.

25 Claims, 6 Drawing Sheets

ASSEMBLY AND METHOD WITH DRIVE DAMPER

CROSS-REFERENCE TO RELATED APPLICATIONS

This application claims the priority benefit of Korean Patent Application No. 2005-64915, filed on Jul. 18, 2005, in the Korean Intellectual Property Office, the disclosure of which is incorporated herein in its entity by reference.

BACKGROUND OF THE INVENTION

1. Field of the Invention

Embodiments of the present invention relate to a recording and/or reproducing apparatus and method with a damper, and in particular, to a recording and/or reproducing apparatus and method installing a disk drive device, such as a hard disk drive or an optical disk drive, including a damper.

2. Description of the Related Art

Recording and/or reproducing apparatuses, such as hard disk drive devices or optical disk drive devices, may include an internal storage body, and can read information recorded on that body, e.g., while the body rotates. For example, a plurality of magnetic disks may be fixed upon a spindle in a hard disk drive, and a magnetic head may read information recorded on the magnetic disk or record information to the magnetic disk while the magnetic disk rotates. Similarly, information recorded on an optical disk medium, such as a CD or DVD, may be used in an optical disk drive. Such recording and/or reproducing apparatuses can store a large amount of information relative to other storage devices of the same size, so the hard disk drive and optical disk drive devices can be used as mass storage devices.

As an example, a hard disk drive device may include a rotating body which is easily damaged from an external impact, so the hard disk drive is normally used in stationary locations such as personal computers, instead of being used in portable devices.

However, as small-size hard disk drives, e.g., using 2.5-inch, 1-inch, and 0.8-inch magnetic disks, have been developed, not only notebooks but also MP3 players and mobile phones have been using such small hard disk drives as a storage device. Since the small-sized hard disk drives are being utilized with portable devices, and because of the increased mass storage capacity and increased data access speeds, the portable devices are able to record and reproduce various multimedia content.

However, when these small-size devices, containing such small-size hard disk drives, receives shocks, the hard disk drive may no longer be recognized by the device or may become inoperable because of the jarring to the hard disk drives. Many effective buffering methods for protecting the hard disk drive have been provided to solve this problem. However, in order to reduce the size of these small-size devices, the space available for the whole hard disk drive assembly has to be small. Reducing the size of a damper, included in the disk drive assembly, to thus further reduce the size of the hard disk drive assembly may actually result in insufficient damping being provided to the disk drive devices when the damper is reduced too much.

Figure 1:
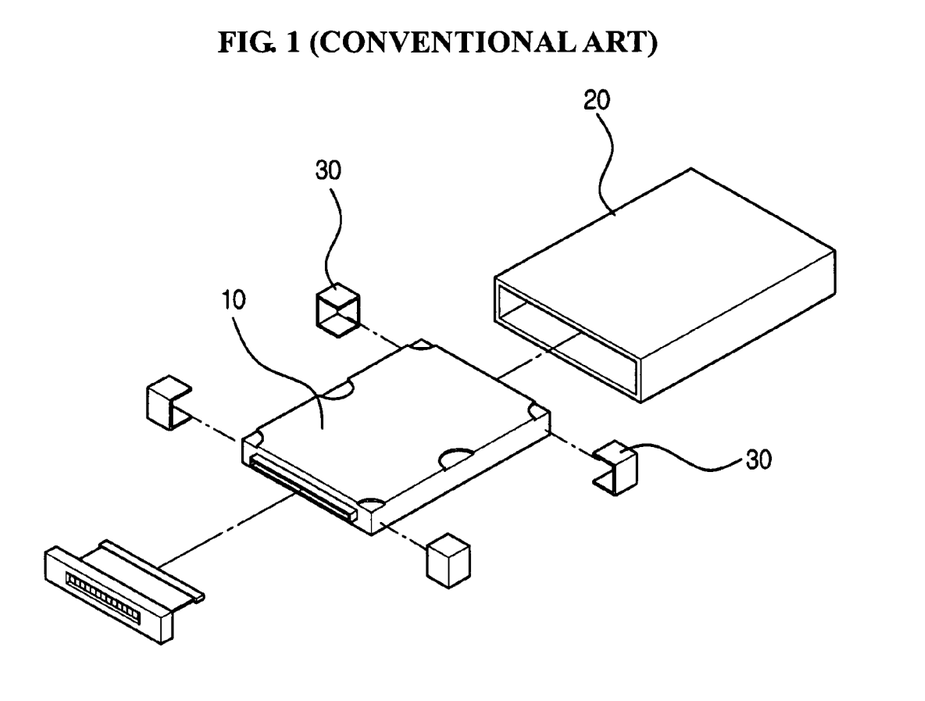
FIG. 1 illustrates a conventional portable hard disk drive device and damper.

FIG. 1 illustrates a conventional portable hard disk drive device with a conventional damper.

Referring to FIG. 1, a hard disk drive 10 may be enclosed by a box 20, with damping elements 30 disposed along the four corners of the hard disk drive 10 to dampen shocks that could be transmitted to the hard disk drive 10. Here, the damping element 30 may cover the corner of the hard disk drive 10, with the inner surface of the damping element 30 being in contact with the hard disk drive 10.

Generally, the damping element 30 is formed from rubber or silicone by injection molding or pressing molding. In order to form a desired shape, such as a wall, band, projection, groove, etc., an elastic molding element has to have a minimum thickness of at least about 0.5 mm or more. Similarly, when producing the damping element 30 from an elastic material such as rubber or silicone, the thickness of the damping element 30 similarly has to be at least approximately 0.5 mm or more. Moreover, when forming a projection on the wall of the damping element 30, e.g., for better damping, the thickness of the damping element 30 having protrusions has to be at least approximately 1.5 mm. Accordingly, since a cover type damper covering the corner of a hard disk has to maintain a minimum thickness of the damper, within the box 20, there is a limit to how much the disk drive assembly can be reduced.

As mentioned the above, since the aforementioned cover type damper is in contact with the hard disk, reducing the thickness too much may decrease the efficiency of the dampers to absorb impacts. Of course, in order to solve this problem, the aforementioned projection may be formed along the outer surface of a cover type damper. However, since the height of the added projection increases the basic thickness of a cover type damper, the installation space required by such a disk drive may be increased.

SUMMARY OF THE INVENTION

According to an embodiment of the present invention, an embodiment of the present invention provides a disk drive assembly that has a small installation space and can effectively protect the disk drive within the disk drive assembly.

According to another embodiment of the present invention, an embodiment of the present invention a damper that has a small installation space and can effectively protect an object from external impacts.

According to still another embodiment of the present invention, an embodiment of the present invention provides a disk drive assembly and a damper which are easily manufactured and installed.

To achieve the above and/or other aspects and advantages, embodiments of the present invention include a disk drive assembly, including a disk drive, and a damper formed in a ring structure, to enable the damper to encircle an edge of the disk drive, and formed of an elastic material to absorb an impact transmitted between an installation surface supporting the disk drive and the disk drive.

The edge may be a corner of the disk drive.

The drive assembly may further include an installation bracket for containing the disk drive as the installation surface. In addition, the installation bracket may envelope corners of the disk drive.

A contact surface of the damper, which is in contact with the disk drive, may have a width smaller than a maximum width or diameter of the damper. The damper may have a round cross section.

The damper may include a core body installed along a corner, as the edge, of the disk drive, and at least one contact portion formed on the surface of the core body, to be in direct contact with the disk drive, the contact portion having a width or diameter larger than the core body.

The at least one contact portion may be formed on the core body at regular or irregular intervals.

A deformation may be formed on a top surface and/or bottom surface of the disk drive adjacent to the edge and the damper includes an anchoring portion inserted into the deformation. The edge may further be a corner of the disk drive.

To achieve the above and/or other aspects and advantages, embodiments of the present invention include a disk drive assembly, including a disk drive, an installation bracket enveloping the disk drive, with a bottom surface and side walls of the installation bracket being in close proximity to a bottom surface and side surfaces of the disk drive, respectively, and a damper formed in a ring structure, to enable the damper to encircle an edge of the disk drive, and formed of an elastic material with a round cross section to absorb an impact between the disk drive and the installation bracket.

The edge may be a corner of the disk drive. The damper may further include a core body formed in a ring structure and installed around the corner of the disk drive, and at least one contact portion, formed as a single body with the core body, with a diameter greater than the core body, to be in contact with the disk drive.

The at least one contact portion may be positioned to be on the top and/or the bottom surface of the disk drive and adjacent to the corner of the disk drive. In addition, the contact portions, positioned on the top and/or the bottom surface, may be separated from each other.

A deformation may be formed on the top surface and/or the bottom surface of the disk drive, adjacent to the corner of the disk drive, and the damper includes an anchoring portion inserted into the deformation, with the anchoring portion being formed in a shape of a cylinder having a rounded end portion.

To achieve the above and/or other aspects and advantages, embodiments of the present invention include a damper for absorbing an impact between an object and an installation surface supporting the object, including a core body formed in a ring structure, with the core body enabled to encircle an edge of the object to keep in contact with an outer surface of the edge, the core body formed of an elastic material to absorb an impact between the object and the installation surface, wherein a contact surface of the core body, contactable with the object, has a width smaller than the maximum width or diameter of the core body. Here, the core body may have a round cross section.

To achieve the above and/or other aspects and advantages, embodiments of the present invention include a damper for absorbing an impact between an object and an installation surface supporting the object, including a core body formed in a ring structure, with the core body enabled to encircle an edge of the object to keep in contact with an outer surface of the edge, the core body formed of an elastic material to absorb an impact between the object and the installation surface, and contact portions formed as a single body with the core body and having a diameter greater than the core body to be in direct contact with the object.

The contact portions may be formed on the core body at regular or irregular intervals.

To achieve the above and/or other aspects and advantages, embodiments of the present invention include a damper for absorbing an impact between an object and an installation surface supporting the object, including a core body formed in a ring structure, with the core body enabled to encircle an edge of the object to keep in contact with an outer surface of the edge, the core body formed of an elastic material to absorb an impact between the object and the installation surface, and an anchoring portion in a shape of a cylinder having a rounded end, the anchoring portion formed perpendicular to the core body as a single body with the core body, contactable with a deformation in the edge of the object To achieve the above and/or other aspects and advantages, embodiments of the present invention include a disk drive assembly, including a disk drive, an installation bracket enveloping the disk drive, with a bottom surface and side walls of the installation bracket being in close proximity to a bottom surface and side surfaces of the disk drive, respectively, and a damper according to an embodiment of the present invention.

To achieve the above and/or other aspects and advantages, embodiments of the present invention include a disk drive dampening method, including buffering surface interaction between a disk drive and a supporting surface through a dampening of an edge of the disk drive by keeping contact between a ring shaped damper and the disk drive along a ringed outer area of the edge, with surfaces of a core body of a damper being formed of an elastic material to provide dampening.

Contact of the core body of the damper with the edge of the disk drive may be intermittent.

To achieve the above and/or other aspects and advantages, embodiments of the present invention include a disk drive dampening method, including buffering surface interaction between a disk drive and a supporting surface through a dampening of an edge of the disk drive by keeping contact between a ring shaped damper and the disk drive along a ringed outer area of the edge with an anchor of the damper, outside of a core body of the damper, with the core body being formed of an elastic material to provide dampening.

The anchor may further be inserted into deformations in the surface of the disk drive.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures, noting that additional and alternative embodiments are equally available.

Figure 2:
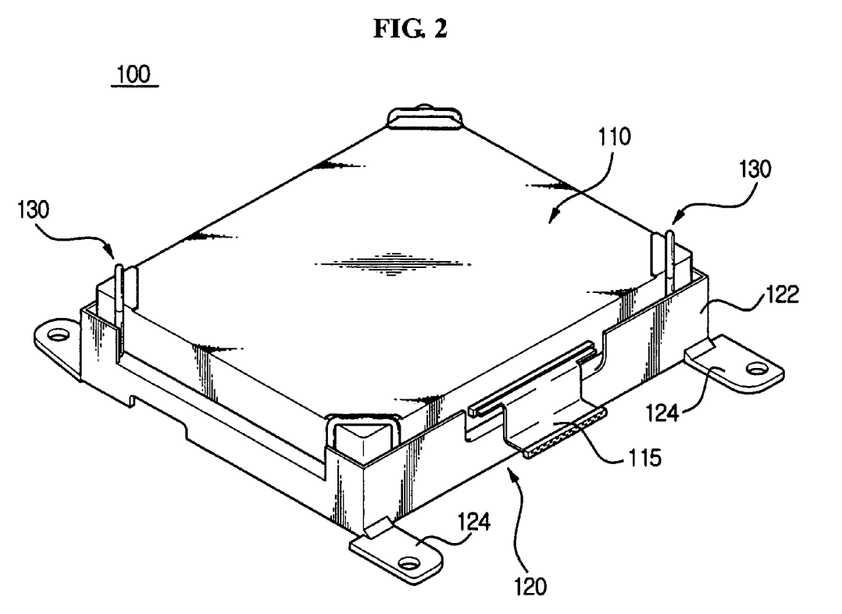
FIG. 2 illustrates an electronic device and a disk drive assembly, according to an embodiment of the present invention.
Figure 3:
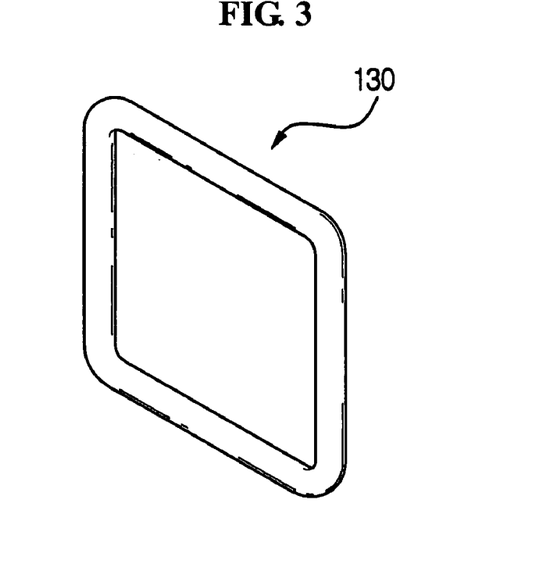
FIG. 3 illustrates a damper of a disk drive assembly, such as the disk drive assembly of FIG. 2, according to an embodiment of the present invention.

FIG. 2 illustrates an electronic device with a disk drive assembly 100, according to an embodiment of the present invention, and FIG. 3 illustrates a damper of a disk drive assembly, such as the disk drive assembly of FIG. 2.

Referring to FIGS. 2 and 3, a disk drive assembly 100 may include a disk drive 110, a bracket 120, and a damper 130, for example. Here, the dampers 130 may be in the shape of a ring and disposed on the four corners of the disk drive 110. The disk drive 110, equipped with dampers 130, may be inserted into the bracket 120, which may already be installed in an electronic device, according to an embodiment of the present invention. The disk drive 110 may be a small-size hard disk, for example, including an approximately 0.8-1.0 inch magnetic disk, with the weight of the disk drive being approximately 10-15 g, noting that alternative embodiments are equally available. The disk drive 110 may also be electrically connected to the electronic device via a flexible connecter 115 such as a flexible printed circuit board (FPCB). Here, such electronic devices could be mobile phones, personal digital assistants (PDAs), or MP3 players, for example. The disk drive 110 may also be installed in the electronic device, e.g., via the bracket 120, and be used as merely a storage device for reading/writing.

Such a bracket 120 may include a housing portion 122 to contain the disk drive 110 and a fastening portion 124 to fasten the disk drive assembly 100 to the electronic device. Further, the housing portion 122 may be formed in the shape of a right hexahedron, for example, corresponding to the shape of the disk drive 110, with the top surface of the housing portion 122 being open in order to ease the installation or removal the disk drive 110. Thus, in such an embodiment, four sidewalls of the housing portion 122 may be formed corresponding to the four side surfaces of the disk drive 110 and located in close proximity to the disk drive, e.g., to have an approximately 0.3-0.8 mm gap. As illustrated, in an embodiment, since a part of the sidewall of the housing portion 122 is partially open or cut away, the flexible connector 115 may be easily connected, and the disk drive may be easily gripped by hand.

The fastening portion 124 may also protrude along the outer surface of the housing portion 122, and include a hole for fastening, e.g., by screw or rivet, to fasten the disk drive 110 to the electronic device. According to another embodiment, the bracket 120 may be installed on a main board of the electronic device, e.g., via the fastening portion 124, and may be installed in a housing or case in addition to the main board.

Referring to FIGS. 2 and 3, the four sidewalls of the housing portion 122 of the bracket 120 may be also kept in close proximity with the four side surfaces of the disk drive 110. Here, the damper 130 having a ring structure, for example, may be disposed along each of the four corners of the disk drive 110 and interposed between the disk drive 110 and the bracket 120.

The damper 130 may further be formed in a closed ring structure with a circular or oval cross section like a cylinder. The damper 130 may be formed from an elastic material such as rubber or silicone, and a small amount of additive may be included according to differing preferred specifications. The damper 130 may basically have a ring structure, e.g., similar to a looped curve. More specifically, the damper 130 may be formed in the shape of a square ring, otherwise the damper 130 may be formed in the shape of a circular/oval ring without folded joints, for example.

The damper 130 may encircle the whole corner of the disk drive 110, for example. According to an embodiment of the present invention, the damper 130 may be in contact with the top surface, bottom surface and two side surfaces of the disk drive 110, at the corner of the disk drive 110. Accordingly, in the disk drive assembly 100, the damper 130 may be interposed between the bottom of the housing portion 122 and the bottom surface of the disk drive 110 and interposed between the two sidewalls of the housing portion 122 and the two side surfaces of the disk drive 110, according to an embodiment of the present invention. As an example, the damper 130 may have a small diameter of not more than 1 mm and be in constant contact with the sidewalls and side surfaces and the bottom surfaces of the disk drive 110 and the housing portion 122.

The damper 130 may have various shapes of cross section, such as a hexagon or an octagon, in addition to a circle/oval, for example, noting that additional embodiments are equally available. Experimentally, the buffering effect was found to be improved as the portion in contact with the disk drive 110, the damper 130 surface area in contact with the bracket 120, or the portion in contact with the both elements 110 and 120 decreases. When the damper 130 has a circular cross section, the impact absorption is was found to be excellent and within preferred guidelines.

Further, in order to mold the damper 130 from rubber or silicone, a thickness of at least 0.5-0.8 mm may be needed. In a conventional cover type damper, the thickness of at least 1.5 mm was required to form a wall surface with a projection, e.g., a damper 30 with a projection beyond the aforementioned damper structure shown in FIG. 1. However, according to an embodiment of the present embodiment, a damper, having a ring shape with a core body diameter of approximately 0.5-0.8 mm, may be provide a buffering effect similar to or more effective than with such a conventional cover type damper. For example, real and simulated experiments were performed with an embodiment of the present invention, based on the above condition, and approximately 55-60% of an impact was buffered.

According to an embodiment of the present embodiment, since the core body is formed to have a diameter of approximately 0.5-0.8 mm, installation space is minimized while an improved buffering effect has been provided. Also, because of the reduced size of the damper 130, the size of the bracket 120 may be reduced. Further, since the damper 130, having a shape of a ring, may be installed over the corner of the disk drive 110, installation and separation may be simply and rapidly performed.

Figure 4:
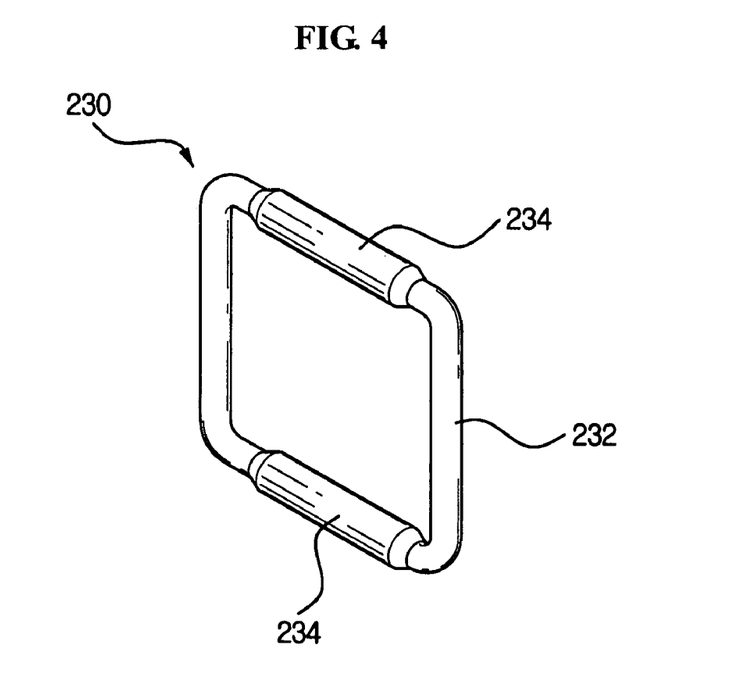
FIGS. 4 through 6 illustrate dampers according to embodiment of the present invention.
Figure 5:
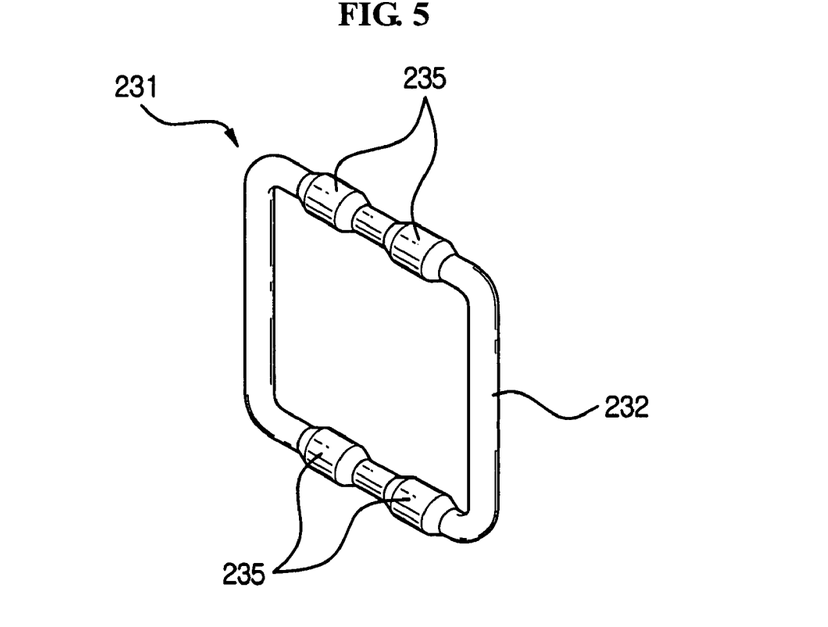
Figure 6:
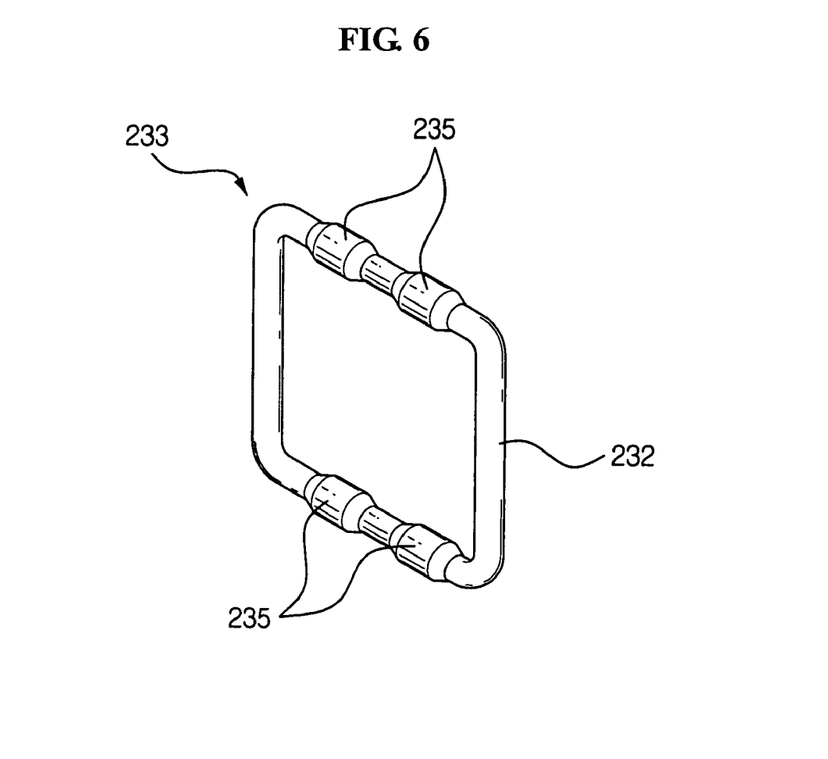

FIGS. 4 through 6 illustrate dampers according to embodiments of the present invention.

Referring to FIG. 4, a damper 230 may include a core body 232 and a contact portion 234, formed as a single body, with the core body 232. The core body 232 may be cylindrical and have a shape of a circular ring or square ring, for example, to encircle all four corners of a disk drive, noting that alternative embodiments are also available. Here, only the contact portion 234, having a greater diameter than the core body 232, would be in contact with the disk drive. In the case when the contact portion 234 is used, in addition to the core body 232, the contact area between the damper 230 and the disk drive may be minimized.

Also, in the case when only the core body 232 is used, the buffering effect may be optimized by controlling the material and the diameter of the core body 232. In an embodiment, not only are the materials and the diameters of the core body 232 controlled, but the diameter and the length of the contact portion 234 may also be controlled to optimize various buffering effects. In actuality, since the material and the diameter of the core body 232 may be generally fixed, optimization by controlling only the material and the diameter of the core body 232 may be restricted. However, since the diameter and the length of the contact portion 234 may be variously changed, the buffering characteristics of the damper 230 may be variously modified by using the contact portion 234.

According to another embodiment, the contact portion 234 may be formed along the exterior of the core body 232 at regular or irregular intervals, for example, and the number of contact portions 234 may be variously changed. In an embodiment, though two contact portions 234 may be formed opposite to each other, four contact portions may also be formed to keep in contact with the four surfaces of the corner of a disk drive. Further, though two contact portions 234 may be installed, e.g., to be located along the top surface and the bottom surface of the corner of the disk drive, two contact portions 234 may be located to be in contact with both side surfaces of the corner, and the center portion of the contact portion 234 may be located to over the corner of the disk drive.

Referring to FIG. 5, in this embodiment, a damper 231 may include a core body 232 formed in a ring structure and contact portions 235 which form a single body with the core body 232. Two pairs of contact portions 235 may be disposed along opposite sides of the core body 232, for example. According to an embodiment, since the contact portion 235 may have a diameter greater than the core body 232, the contact portions 235 may be in constant contact with the disk drive and the contact area between the damper 231 and the disk drive may be kept smaller than the case when only the core body 232 is used. Also, since the contact area by the two contact portions 235 may be kept smaller than when the contact portion 234 of FIG. 4 are used, the buffering effect may further be improved.

Referring to FIG. 6, in this embodiment, a damper 233 may include a core body 232 and a spherical contact portions 236 which form a single body with the core body 232. Here, two pairs of contact portions 236 may be disposed on opposite sides of the core body 232. According to an embodiment, since the contact portion 236 may have a diameter greater than the core body 232, the contact portion 236 would be in constant contact with the disk drive. In addition, since the contact portion 236 is formed in the shape of a sphere or a ball, for example, the contact area between the damper 232 may be kept smaller than the contact portions 234 and 235 described above.

Figure 7:
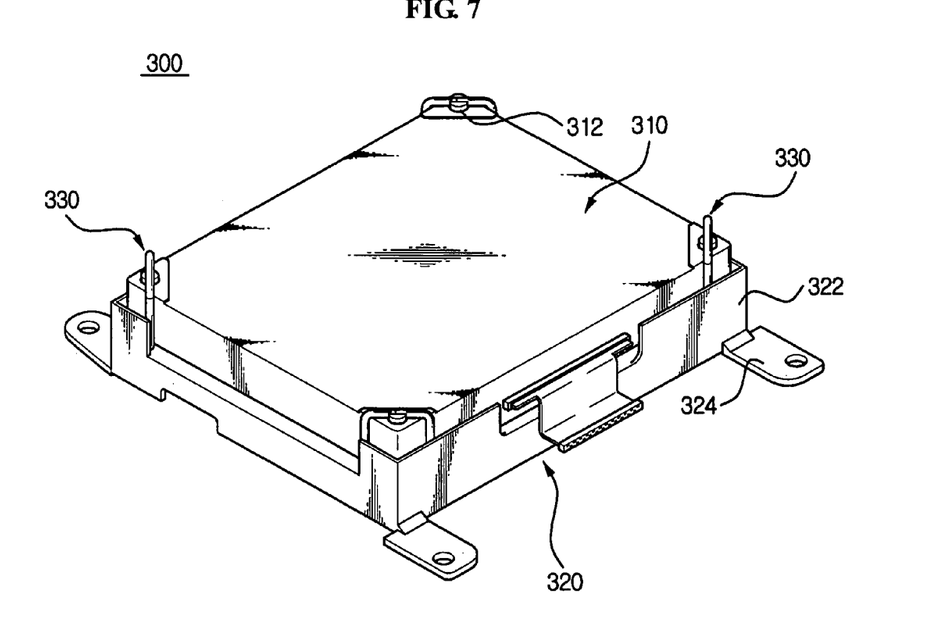
FIG. 7 illustrates a disk drive assembly, according to another embodiment of the present invention.
Figure 8:
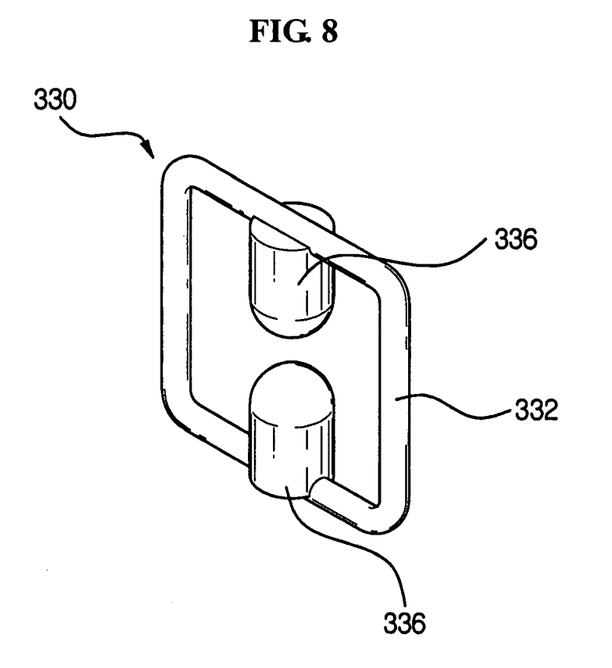
FIG. 8 illustrates a damper of a disk drive assembly, such as the disk drive assembly of FIG. 7, according to an embodiment of the present invention.

FIG. 7 illustrates a disk drive assembly according to another embodiment of the present invention, and FIG. 8 illustrates a damper of a disk drive assembly, such as the disk drive assembly of FIG. 7, according to an embodiment of the present invention.

Referring to FIGS. 7 and 8, a disk drive assembly 300 may include a disk drive 310, a bracket 320, and dampers 330, for example. The dampers 330, e.g., in the shape of a ring, may encircle all four corners of the disk drive 310, and the disk drive, equipped with the dampers 330, may be inserted into the bracket 320, which may be previously installed, e.g., in a certain electronic device. The disk drive 310, as used in this embodiment, may be a small hard disk that can be electrically connected to a certain electronic device via a flexible connector, for example.

Here, the bracket 320 may include a housing portion 322 and a fastening portion 324. The housing portion 322 may be formed in the shape of a box, for example, whose top surface may be open, with the four sidewalls of the housing portion 322 being provided to be in close proximity to the four side surfaces of the disk drive 310. The fastening portion 324 may be formed along the outer surface of the housing portion 322 with a hole, e.g., for fastening by screw or rivet, formed on the fastening portion 324.

Referring to FIGS. 7 and 8, the damper 330 may further include a core body 332 and an anchoring portion 336. The illustrated damper 330 may have a ring structure and the core body 332 may be cylindrical, for example. Also, the damper 330 may be formed of an elastic material such as rubber or silicone and may be formed in the shape of a square or circular ring corresponding to the shape of the disk drive 310, according to an embodiment of the present invention, noting that alternative embodiments are equally available.

The anchoring portion 336 may be formed vertically on the damper 330 and formed in the shape of a cylinder, for example. Here, the end of the anchoring portion, which may not be connected to the core body 332, may be rounded. With this embodiment, the anchoring portion 336 may be inserted into a deformation, e.g., a hole 312, formed on the corner of the disk drive 310. Accordingly, assembly personnel may insert the anchoring portion 336 into the hole 312, thereby easily installing the damper 330 along the corner of the disk drive 310. In this case, since the end of the anchoring portion 336 may be rounded, the anchoring portion 336 may be easily inserted into the hole 312. In addition, since the body of the anchoring portion 336 may be formed in a cylinder shape, corresponding to the shape of the hole 312, the anchoring portion 336 may be inserted into the hole 312 and securely anchored.

The damper 330 can encircle the corner of the disk drive 310 and may be in contact with the disk drive 310 around each corner, and to easily install the damper 330, the anchoring portion 336 may be inserted into the hole 312. The core body 332 may be interposed between the bottom of the housing portion 322 and the bottom surface of the disk drive 310 and interposed between both sidewalls of the housing portion 332 and both side surfaces of the disk drive 310 in the disk drive assembly 300, for example.

In the damper 330, the diameter of the core body 332 may be reduced to 0.5-0.8 mm, for example, and still provide a buffering effect similar to or more effective than with a conventional damper.

Figure 9:
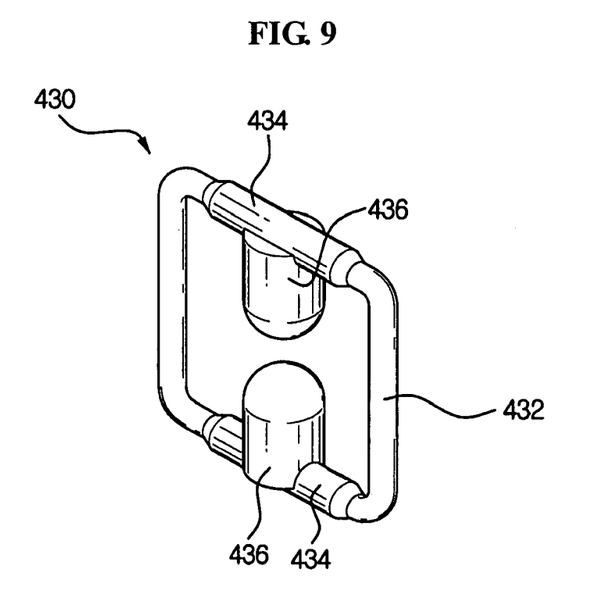
FIG. 9 illustrates a damper according to another embodiment of the present invention.

FIG. 9 illustrates a damper according to another embodiment of the present invention.

Referring to FIG. 9, a damper 430, e.g., in the shape of ring, includes a core body 432, a contact portion 434, and an anchoring portion 436, for example. Here, the core body 432 may be in the shape of a cylinder and may encircle the four corners of a disk drive. According to this embodiment, two contact portions 434 may be formed on the core body 432. Since the contact portion 434 has a diameter greater than the core body 432, the contact portion 434 may be directly in contact with the disk drive. Also, the anchoring portion 436 may be formed vertically on the damper 430 from the center of the contact portion 434. The anchoring portion 436 may include a rounded end with two anchoring portions 436 being formed opposite to each other.

Since the contact portion 434 is used, a greater buffering effect may be expected than when only the core body 432 is used. Further, since the anchoring portion 436 is used, initial installation of the damper 430 may be easily and rapidly performed. Also, the diameter and the length of the contact portion 434 may be variously changed to control the desired characteristic of the damper 430.

Embodiments of the present invention provides dampers that can sufficiently function as a damper, while utilizing only a small installation space, permitting easy installation and removal. Also, since the damper has a simple shape, it is easy to manufacture the damper and manufacturing costs may be notably lower than conventional dampers.

Accordingly, the size of a disk drive assembly, using a damper according to an embodiment of the present invention, may be reduced and an installed disk drive may be safely protected.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk drive assembly, comprising:
   a disk drive; and
   a damper formed in a ring structure, to enable the damper to encircle an edge of the disk drive, and formed of an elastic material to absorb an impact transmitted between an installation surface supporting the disk drive and the disk drive.

2. The assembly of claim 1, wherein the edge is a corner of the disk drive.

3. The assembly of claim 1, further comprising an installation bracket for containing the disk drive as the installation surface.

4. The assembly of claim 3, wherein the installation bracket envelopes corners of the disk drive.

5. The assembly of claim 1, wherein a contact surface of the damper, which is in contact with the disk drive, has a width smaller than a maximum width or diameter of the damper.

6. The assembly of claim 5, wherein the damper has a round cross section.

7. The assembly of claim 1, wherein the damper includes:
   a core body installed along a corner, as the edge, of the disk drive; and
   at least one contact portion formed on the surface of the core body, to be in direct contact with the disk drive, the contact portion having a width or diameter larger than the core body.

8. The assembly of claim 7, wherein the at least one contact portion is formed on the core body at regular or irregular intervals.

9. The assembly of claim 1, wherein a deformation is formed on a top surface and/or bottom surface of the disk drive adjacent to the edge and the damper includes an anchoring portion inserted into the deformation.

10. The assembly of claim 9, wherein the edge is a corner of the disk drive.

11. A disk drive assembly, comprises:
    a disk drive;
    an installation bracket enveloping the disk drive, with a bottom surface and side walls of the installation bracket being in close proximity to a bottom surface and side surfaces of the disk drive, respectively; and
    a damper formed in a ring structure, to enable the damper to encircle an edge of the disk drive, and formed of an elastic material to absorb an impact between the disk drive and the installation bracket.

12. The assembly of claim 11, wherein the edge is a corner of the disk drive.

13. The assembly of claim 12, wherein the damper comprises:
    a core body formed in a ring structure and installed around the corner of the disk drive; and
    at least one contact portion, formed as a single body with the core body, with a diameter greater than the core body, to be in contact with the disk drive.

14. The assembly of claim 13, wherein the at least one contact portion is positioned to be on the top and/or the bottom surface of the disk drive and adjacent to the corner of the disk drive.

15. The assembly of claim 14, wherein the contact portions, positioned on the top and/or the bottom surface, are separated from each other.

16. The assembly of claim 12, wherein a deformation is formed on the top surface and/or the bottom surface of the disk drive, adjacent to the corner of the disk drive, and the damper includes an anchoring portion inserted into the deformation, with the anchoring portion being formed in a shape of a cylinder having a rounded end portion.

17. A damper for absorbing an impact between an object and an installation surface supporting the object, comprising:
    a core body formed in a ring structure, with the core body enabled to encircle an edge of the object to keep in contact with an outer surface of the edge, the core body formed of an elastic material to absorb an impact between the object and the installation surface, wherein a contact surface of the core body, contactable with the object, has a width smaller than the maximum width or diameter of the core body.

18. The damper of claim 17, wherein the core body has a round cross section.

19. A damper for absorbing an impact between an object and an installation surface supporting the object, comprising:
    a core body formed in a ring structure, with the core body enabled to encircle an edge of the object to keep in contact with an outer surface of the edge, the core body formed of an elastic material to absorb an impact between the object and the installation surface; and
    contact portions formed as a single body with the core body and having a diameter greater than the core body to be in direct contact with the object.

20. The damper of claim 19, wherein the contact portions are formed on the core body at regular or irregular intervals.

21. A damper for absorbing an impact between an object and an installation surface supporting the object, comprising:
    a core body formed in a ring structure, with the core body enabled to encircle an edge of the object to keep in contact with an outer surface of the edge, the core body formed of an elastic material to absorb an impact between the object and the installation surface; and
    an anchoring portion in a shape of a cylinder having a rounded end, the anchoring portion formed perpendicular to the core body as a single body with the core body, contactable with a deformation in the edge of the object.

22. A disk drive dampening method, comprising: buffering surface interaction between a disk drive and a supporting surface through a dampening of an edge of the disk drive by keeping contact between a ring shaped damper and the disk drive along a ringed outer area of the edge, with surfaces of a core body of a damper being formed of an elastic material to provide dampening.

23. The method of claim 22, wherein contact of the core body of the damper with the edge of the disk drive is intermittent.

24. A disk drive dampening method, comprising:
    buffering surface interaction between a disk drive and a supporting surface through a dampening of an edge of the disk drive by keeping contact between a ring shaped damper and the disk drive along a ringed outer area of the edge with an anchor of the damper, outside of a core body of the damper, with the core body being formed of an elastic material to provide dampening.

25. The method of claim 24, wherein the anchor is inserted into deformations in the surface of the disk drive.

* * * * *